United States Patent
Higo et al.

(10) Patent No.: US 6,524,997 B1
(45) Date of Patent: Feb. 25, 2003

(54) PHOTOCATALYST-BEARING MATERIAL AND METHOD OF PRODUCING THE SAME

(75) Inventors: Yuji Higo, Yokohama (JP); Daisaku Yano, Toda (JP)

(73) Assignee: Organo Corporation, Tokyo (JP)

( * ) Notice: Subject to any disclaimer, the term of this patent is extended or adjusted under 35 U.S.C. 154(b) by 59 days.

(21) Appl. No.: 09/680,123

(22) Filed: Oct. 4, 2000

(51) Int. Cl.⁷ ................................................. B01J 21/00
(52) U.S. Cl. ....................... 502/439; 502/350
(58) Field of Search ................ 502/150, 350, 502/439

(56) References Cited

U.S. PATENT DOCUMENTS

| | | | | |
|---|---|---|---|---|
| 5,821,186 A | * | 10/1998 | Collins | 204/456 |
| 5,853,866 A | | 12/1998 | Watanabe et al. | 428/312.8 |
| 5,854,169 A | | 12/1998 | Heller et al. | 502/242 |
| 5,872,072 A | * | 2/1999 | Mouri et al. | 502/208 |
| 6,027,797 A | | 2/2000 | Watanabe et al. | 428/312.8 |
| 6,217,999 B1 | * | 4/2001 | Zhang et al. | 427/213.34 |
| 2002/0005145 A1 | * | 1/2002 | Sherman | 106/436 |

FOREIGN PATENT DOCUMENTS

JP  08 208414  8/1996

OTHER PUBLICATIONS

Abstract of Hei 08–208414 Aug. 13, 1996.

* cited by examiner

Primary Examiner—Stanley S. Silverman
Assistant Examiner—Edward M. Johnson
(74) Attorney, Agent, or Firm—Norris McLaughlin & Marcus

(57) ABSTRACT

A carrier (A) of thermoplastic polymer is mixed and contacted with photocatalytic particles (B) preferably in a rotary heating drum to fusion-bond the particles (B) to surface portions of the carrier (A) in such a manner that multiple particles (B) are stacked in directions perpendicular to the surfaces of the carrier (A), whereby a photocatalyst-bearing material can be produced, which is capable of exhibiting a high photocatalysis for a long period of time. When water is the object of treatment, the specific gravity of the photocatalyst-bearing material is preferably 0.7 to 1.3, especially preferably 0.9 to 1.1.

6 Claims, 5 Drawing Sheets

PHOTOCATALYST-BEARING MATERIAL AND METHOD OF PRODUCING THE SAME

BACKGROUND OF THE INVENTION

1. Field of the Invention

The present invention relates to a photocatalyst-bearing material usable for environmental cleanup of the air, water, etc. and effective utilization of light energy such as solar energy, and to a method of producing the same.

2. Related Art

When photocatalyst particles are irradiated with a light having an energy of at least the band gap thereof, electrons and holes come into existence in the conduction band and valence band, respectively, of the photocatalyst particles due to light excitation. The electrons produced in the conduction band have a strong reducing power, while the holes produced in the valence band have a strong oxidizing power. Thus, these photocatalyst particles are utilized for the purposes of cleanup of harmful substances, deodorization of malodorous substances, decomposition of water, sterilization, etc. [see Kazuhito Hashimoto, Akira Fujishima, "Application of Photocatalytic Reactions to Water Purification," Journal of Water and Waste, Vol. 36, No. 10, pp. 851–857 (1994); Sadao Murasawa, "Deodorization Method Using Photocatalyst," Environmental Management, Vol. 32, No. 8, pp. 929–934 (1996); Kazuhiro Sayama, Hironori Arakawa, "Stoichiometric Decomposition of Water over Semiconductor Photocatalyst," Catalysts and Catalysis, Vol. 39, No. 3, pp. 252–256 (1997); etc.]. Incidentally, photocatalytic reactions are mainly oxidation reactions basically attributed to holes excited by photons, which reactions usually proceed only on the surfaces of photocatalyst particles and more particularly only on sites thereof irradiated with a light such as ultraviolet rays.

Such photocatalyst particles must be easily handleable, and easily separable and recoverable from a liquid treated therewith in most cases. For this reason, photocatalyst particles are generally used in such a state that they are supported or coated on a carrier such as a flat plate, a granular material, a honeycomb structure or a three-dimensional reticular structure. Methods of supporting photocatalyst particles on a carrier include one involving precipitating and fixing photocatalyst particles on a carrier [see Japanese Patent Laid-Open No. 5-96181 published on Apr. 20, 1993; and Masayuki Murabayashi, Kazuo Okamura, "Degradation of Chloroorganic Compounds by Using Fixed Photocatalyst," Journal of Water and Waste, Vol. 36, No. 10, pp. 877–882 (1994)], a sol-gel method involving supporting a photocatalytic chemical substance produced on a carrier by heat decomposition of an organic compound such as titanium tetraisopropoxide [see Katsuhiko Yoshida, Kazuo Okamura, Koji Hirano, Kiyoshi Iguchi, Kiminori Itoh & Masayuki Murabayashi, "Photocatalytic Degradation of Trichloroethylene in Water by Using Thin-film $TiO_2$ Prepared by Sol-Gel Process," Journal of Japan Society on Water Environment, Vol. 17, No. 5, pp. 324–329 (1994)], and one involving preliminary dispersion of photocatalyst particles in a carrier material [see Japanese Patent Laid-Open No. 8-208414 published on Aug. 13, 1996].

The method involving precipitating and fixing photocatalyst particles on a carrier leaves much to be desired as these particles are readily released, or dislodged, so that the total area of particles wherein photocatalysis can be manifested is decreased in keeping with an increasing number of sites released of photocatalyst particles, thereby lowering the reaction efficiency. The sol-gel method is so complicated in preparation operations as to be unfit for mass production, and cannot give rise to a sufficient activity of photocatalyst because the amount of supported photocatalyst is limited. Further, in this method, a heat-resistant material (glass, metal or the like), which is difficult to handle and expensive, must disadvantageously be used as the carrier material because heating up to at least 300° C. must usually be done for heat decomposition of the organic compound. The method involving preliminary dispersion of photocatalyst particles in a carrier material is gravely wasteful because photocatalyst particles are unnecessarily buried inside the carrier.

An object of the present invention, which has been made in view of the foregoing various shortcomings of the prior art, is to provide a photocatalyst-bearing material capable of exhibiting a high photocatalysis for a long period of time, and an inexpensive method of producing the same.

SUMMARY OF THE INVENTION

As a result of intensive investigations with a view to doing away with the foregoing shortcomings of the prior art, the inventors of the present invention have found out that bearing particles (B) capable of photocatalysis in and on surface portions of a carrier (A) of thermoplastic polymer by fusion bonding enables the particles (B) to be firmly borne, or supported, on the carrier (A) in such a state that multiple particles (B) are stacked in directions perpendicular to the surfaces of the carrier (A). The present invention has been completed based on this finding.

Specifically, the present invention provides a photocatalyst-bearing material characterized in that particles (B) capable of photocatalysis are fusion-bonded to surface portions of a carrier (A) of thermoplastic polymer in such a state that multiple particles (B) are stacked in directions perpendicular to the surfaces of the carrier (A); and a method of producing a photocatalyst-bearing material, characterized by comprising mixing and contacting a carrier (A) of thermoplastic polymer with particles (B) capable of photocatalysis to fusion-bond the particles (B) to surface portions of the carrier (A) in such a manner that multiple particles (B) are stacked in directions perpendicular to the surfaces of the carrier (A).

The photocatalyst-bearing material of the present invention, which is different from a simple mixture of the carrier (A) with particles (B), is a material having particles (B) borne in and on surface portions of the carrier (A) by fusion bonding, and maintaining a state that particles (B) are partly exposed from the surfaces of the carrier (A) [see FIGS. 1 and 2]. Since multiple particles (B) are stacked in and on a surface portion of every grain of the carrier (A), release, or dislodgment (exfoliation), of some particles (B), even when brought about because of deterioration of the surface of that grain of the photocatalyst-bearing material, lets particles (B) thereunder be sequentially exposed from the surface. Thus, the photocatalyst-bearing material of the present invention can continuously maintain the photocatalysis thereof over a long period of time. Moreover, the method of producing a photocatalyst-bearing material according to the present invention is simply and easily operable to be favorably usable for mass production thereof.

The process of formation of the foregoing photocatalyst-bearing material by the method of producing a photocatalyst-bearing material according to the present invention will be described to be as follows: Surface portions of the carrier (A) are fused, or molten, by heating.

Simultaneously, the carrier (A) and particles (B) are mixed and stirred together to fusion-bond some particles (B) to the molten surfaces of the carrier (A). Upon further heating, some melt of the thermoplastic polymer of the carrier (A) is oozed out from between particles (B) fusion-bonded to the surfaces of the carrier (A), thereby further fusion-bonding some other particles (B) to the oozed-out melt of the thermoplastic polymer of the carrier (A). According to the foregoing mechanism that is repeated, multiple particles (B) are stacked and borne on the carrier (A) to produce the photocatalyst-bearing material of the present invention.

The shapes of the carrier (A) and the photocatalyst-bearing material of the present invention may be arbitrary, but are preferably substantially spherical or disk-like from the viewpoint of simplicity of the production procedure. Substantially spherical ones are preferred in respect of handleability, while substantially disk-like ones are preferred because the exposed surface areas thereof are large. The size of the photocatalyst-bearing material of the present invention is not particularly limited, but may be set arbitrarily. For example, where the material is substantially spherical, the average grain size thereof may be 0.1 mm to 30 mm, and is preferably 0.5 mm to 10 mm, more preferably 1 mm to 5 mm.

Examples of the thermoplastic polymer usable in the present invention include olefin homopolymers such as polyethylene and polypropylene, olefin copolymers (copolymers of olefins), copolymers of an olefin(s) with other polymerizable monomer(s), polyvinyl chloride, polyvinylidine chloride, polystyrene, poly(meth)acrylates such as polymethyl methacrylate, polyamides, and polyesters such as polyethylene terephthalate and polyethylene naphthalate. Among them, thermoplastic polymers especially preferred for use as the material of the carrier (A) in respect of capability of easily and firmly bearing particles (B) in such a manner that multiple particles (B) are stacked in directions perpendicular to the surfaces of the carrier (A) include olefin homopolymers, olefin copolymers, and copolymers of an olefin(s) with other polymerizable monomer(s). Herein, examples of suitable olefins include ethylene, propylene, butenes, hexenes, 4-methylpentene, and octenes. Other polymerizable monomers include alicyclic monoenes such as norbornene and cyclopentene; dienes such as butadiene, isoprene, cyclopentadiene, dicyclopentadiene, hexadiene, and octadiene; vinyl esters such as vinyl acetate, vinyl propionate, vinyl benzoate, vinyl lactate, and vinyl monochloroacetate; unsaturated carboxylic acids such as acrylic acid, methacrylic acid, vinylacetic acid, crotonic acid, maleic acid, itaconic acid, and fumaric acid; alkyl esters, alkali metal salts, alkaline earth metal salts, ammonium salts and acid anhydrides of such unsaturated carboxylic acids; unsubstituted or substituted (meth) acrylamides such as acrylamide, methacrylamide, and N-methylacrylamide; acrylonitrile; methacrylonitrile; sulfonic group-containing monomers such as p-styrenesulfonic acid and 2-acrylamido-2-methylpropanesulfonic acid; phosphonic group-containing monomers such as allylphosphonic acid and vinylphosphonic acid; N-vinylpyrrolidone; N-vinylformamide; acrolein; vinyl chloride; vinylidene chloride; chloroprene; ethylene fluoride; and styrene. Examples of especially preferred thermoplastic polymers include low-density polyethylene, high-density polyethylene, polypropylene, ethylene-butene-1 copolymers, ethylene-hexene-1 copolymers, ethylene-propylene copolymers, ethylene-octene-1 copolymers, ethylene-acrylic acid copolymers, ethylene-vinyl acetate copolymers, ethylene-vinyl alcohol copolymers, poly(4-methylpentene-1), ethylene-propylene-diene copolymers, and ethylene-maleic anhydride copolymers. Polyethylene is a thermoplastic polymer that is especially advantageous in cost. Such thermoplastic polymers may be used either alone or in the form of a blend of at least 2 kinds thereof. At least one olefin homopolymer or copolymer, if contained as the main component, may be blended with at least one of polymers other than the above preferred thermoplastic polymers and/or at least one of inorganic fillers. Examples of such blendable polymers include thermoplastic resins such as polyamide resins, polyester resins, polyester or polyamide thermoplastic elastomers, polysulfones, ABS, MBS, polyether-imides, polyether ether ketones, polycarbonates, polystyrene, polyphenylene ethers, and polyphenylene sulfides; thermosetting resins such as phenolic resins, epoxy resins, urea resins, unsaturated polyester resins, and polyimide resins; and synthetic rubbers such as styrene-butadiene rubbers, butadiene rubber, isoprene rubber, acrylonitrile-butadiene rubbers, chloroprene rubber, urethane rubbers, EPM, EPDM, silicone rubbers, and fluororubbers. Examples of inorganic fillers include fibrous fillers such as glass fibers, potassium titanate whiskers, and carbon fibers; substantially platy fillers such as mica and talc; and substantially spherical fillers such as calcium carbonate, carbon black, ferrite, and zeolite.

The melting temperature of the thermoplastic polymer is preferably in the range of 50 to 150° C. for production of the photocatalyst-bearing material according to the method of the present invention. Since the tolerable range of the melting temperature may be greatly varied depending on the kind, material, etc. of the thermoplastic polymer, however, it is not limited to the above preferable range. Herein, the melting temperature is measured according to JIS K7121. When the melting temperature is lower than 50° C., there may be a fear of failure in maintaining the shape of the photocatalyst-bearing material because the temperature of an object of treatment such as water may approach too close to the melting temperature though it depends on reaction conditions such as the site for installing a reactor using the photocatalyst-bearing material, and the reaction temperature. On the other hand, when the melting temperature exceeds 150° C., heating means such as a drum may be limited to be unfit for industrial mass production in many cases.

Examples of particles (B) usable in the present invention include particles of photocatalytic substances such as titanium dioxide, strontium titanate, zinc oxide, iron oxides, zirconium oxide, niobium oxide, tungsten oxide, tin oxides, cadmium sulfide, cadmium telluride, cadmium selenide, molybdenum sulfide, and silicon. Among them, at least one kind of particles can be chosen for use. Preferred is titanium dioxide, which is capable of manifesting an especially excellent photocatalytic performance. Crystal structures of titanium dioxide include anatase type and rutile type. Anatase titanium dioxide is usually used because of a higher photocatalysis. When it is used together with an oxidizing agent, such as hydrogen peroxide, which is capable of forming hydroxy radicals having a strong oxidizing function, however, rutile titanium dioxide may sometimes exhibit a high photocatalysis. Therefore, rutile titanium dioxide is not excluded in the present invention. Use may be made of particles (B) having their surfaces dotted, or loaded, with a metal such as platinum, rhodium, ruthenium or nickel, or an oxide or hydroxide of such a metal. In this case, the photocatalytic efficiency can be improved even if the amount of the dotting substance is extremely small. Particles (B) may have their surfaces dotted, or loaded, with a substance having a light-storing function. Suitably usable examples of such a light-storing substance include those comprising a sulfide, sulfate, silicate or like of alkaline earth metal as the main component, and lead, manganese, bismuth or the like added thereto as an activator. Specific examples of them include BaSO4/Pb, $CaSiO_3$/Pb, and CaS/Bi, which may be used either alone or in combination of at least 2 kinds thereof. The light-storing substance, which is generally called a fluorescent substance, a luminous substance or the like, is a substance capable of once converting the energy of visible light, ultraviolet rays, radiation or the like into a chemical energy for energy storage, and then emitting that chemical energy in the form of a light energy at any time. When this substance is dotted, or borne, over particles (B), the efficiency of light utilization may be improved.

Although the amount of particles (B) borne on the carrier (A) cannot be specified because it varies or is varied largely depending on the kind of photocatalyst particles, the kind of thermoplastic polymer, etc., it is preferably 0.1 to 80 wt. %, more preferably 1 to 50 wt. %, based on the total weight of carrier (A)+particles (B). When it is smaller than 0.1 wt. %, particles (B) are liable to hardly cover the whole surfaces of the carrier (A). On the other hand, when it exceeds 80 wt. %, there arises only an increase in the amount of photocatalyst particles (B) unnecessarily buried inside the photocatalyst-bearing material. This is not so meaningful.

BRIEF DESCRIPTION OF THE DRAWINGS

The foregoing objects, features and advantages of the present invention will be better understood from the following description taken in connection with the accompanying drawings, in which.

PREFERRED MODES FOR CARRYING OUT THE INVENTION

Preferred modes for carrying out the present invention will now be described, but should not be construed as limiting the scope of the invention.

Pellets obtained by the strand cutting method, the underwater cutting method or the like can be used as such as the carrier (A) of thermoplastic polymer for use in the present invention. In this case, if a large tensile stress remains in pellets through production thereof, fusion bonding of photocatalyst particles (B) for bearing them on the carrier (A) makes the resulting photocatalyst-bearing material substantially disk-like. Alternatively, pellets or classified particles of the polymer may be subjected to extrusion, and subsequent stretching and cutting, or the like operations, thereby to prepare beads (one form of grains) having a more uniform grain size. In order to make the carrier (A) substantially spherical, roughly or approximately spherical pellets of thermoplastic polymer may be heated, for example, at a temperature, which is at most about 30° C. higher than the melting temperature of the polymer, in a medium incapable of dissolving the polymer to which medium a dispersant is added. More specifically, a preferred method of producing beads of thermoplastic polymer having a uniform grain size comprises dispersing substantially uniformly-shaped grains preliminarily formed of thermoplastic polymer in a medium admixed with a dispersant at a temperature of at most the melting temperature of the polymer, and then heating them at a temperature from the melting temperature of the polymer to 30° C. higher than that melting temperature, preferably to 20° C. higher than that melting temperature, while keeping the dispersed state of the grains. Examples of the dispersant include water-soluble polymers such as polyvinyl alcohol and polyvinylpyrrolidone; fine inorganic particles such as alumina and silica; and surfactants such as naphthalenesulfonic acid-formaldehyde condensate, sodium oleate, dodecylamine, polyoxyethylene alkyl ethers, and polyoxyethylene alkylphenol ethers. Examples of the medium include water, aqueous salt solutions, silicone oils, liquid paraffin, and lubricating oils, from which a suitable medium may be chosen depending on the melting temperature of the thermoplastic polymer.

Figure 3:
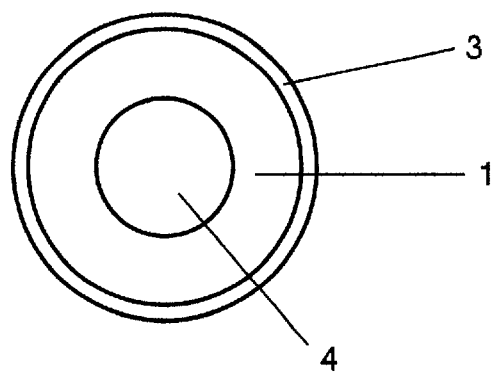
FIG. 3 is a model diagram illustrating a cross-sectional structure of another example of the photocatalyst-bearing material of the present invention.

In order to adjust the specific gravity of the resulting photocatalyst-bearing material to a lower value, use may be made of a hollow carrier (A), which is obtained, for example, by dispersing shirasu balloons, glass balloons or the like in a thermoplastic polymer, or by wrapping, or burying, glass balloons in a thermoplastic polymer (see FIG. 3). In order to adjust the specific gravity of the resulting photocatalyst-bearing material to a higher value, a thermoplastic polymer may be preliminarily milled together with a substance having a high specific gravity (e.g., metal or the like) before preparation of a carrier (A), and surface portions of grains of the polymer as the carrier (A) are loaded with particles (B) by fusion bonding, whereby a photocatalyst-bearing material having its specific gravity adjusted to a desired value can be prepared. Further, a thermoplastic polymer milled together with a magnetic substance such as iron, tri-iron tetroxide, nickel, iron-cobalt, silicon steel or ferrite, or containing such a substance as nuclei may be prepared, followed by production of a photocatalyst-bearing material recoverable by a magnetic force. The specific gravity of the photocatalyst-bearing material is not particularly limited, but may be set depending on the object of treatment and the like. Where water is the object of treatment, that specific gravity is preferably in the range of 0.7 to 1.3, more preferably in the range of 0.9 to 1.1. When it is lower than 0.7, the resulting photocatalyst-bearing material may be poor in reaction efficiency because it always floats on the surface of water even under stirring. When it exceeds 1.3, a difficulty may be encountered in efficiently irradiating the resulting photocatalyst-bearing material with a light because it always sinks to the bottom of water even under stirring.

At least one kind of polymer selected from among olefin homopolymers, olefin copolymers and copolymers of an olefin(s) with other polymerizable monomer(s) is preferably used as the thermoplastic polymer. Particularly in this case, the melting temperature of the thermoplastic polymer as measured according to JIS K7121 is favorably in the range of 50 to 150° C. as mentioned above since multiple particles (B) can be easily and firmly borne on the carrier (A) in a state of being stacked in directions perpendicular to the surfaces of the carrier (A).

Figure 4:
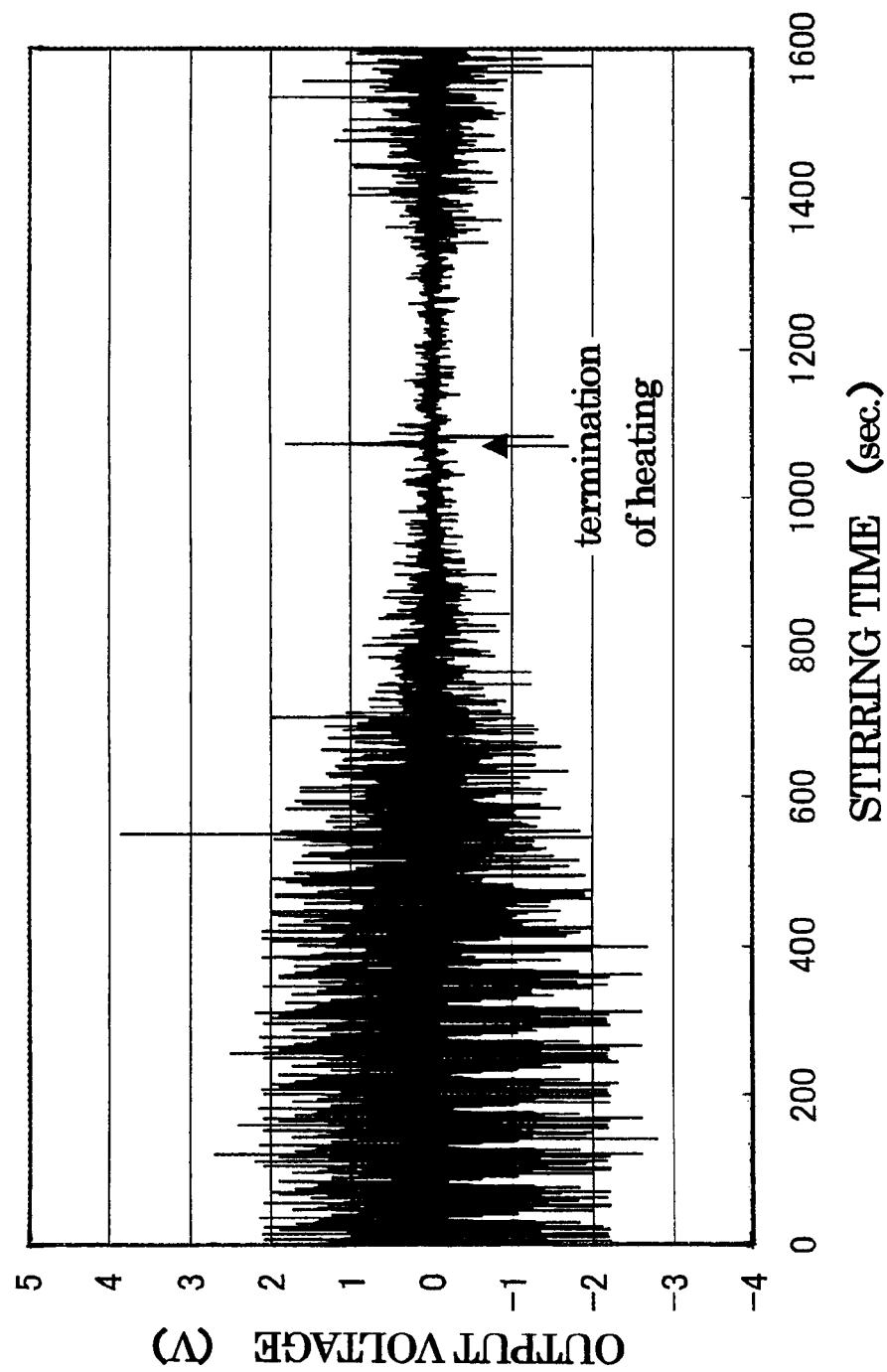
FIG. 4 is a graph showing results obtained by recording changing sounds (expressed in terms of the output voltage of a microphone) of collisions of carrier grains being stirred together with photocatalyst particles in a stirring unit being heated with the lapse of time in Example 2.

Fusion bonding treatment is especially advantageously effected at a temperature higher than the melting temperature of the thermoplastic polymer since multiple particles (B) can be easily and firmly borne on the carrier (A) in a state of being stacked in directions perpendicular to the surfaces of the carrier (A). When fusion bonding treatment is effected at a temperature lower than the melting temperature of the carrier (A), the fusion bonding of particles (B) to surface portions of the carrier (A) may be so insufficient that particles (B) may be easily released, or debonded, from the surfaces of the carrier (A) to fail in maintaining the photocatalysis thereof for a long period of time. When fusion bonding treatment is effected at or above the melting temperature of the carrier (A), sounds of collisions caused by stirring the carrier (A) and photocatalyst particles (B) may become a yardstick for the heating time during the course of fusion bonding treatment. Specifically, such sounds of collisions change in keeping with the decreasing amount of particles (B) not yet fusion-bonded during the progress of fusion bonding of particles (B) being borne on the carrier (A). Fusion bonding treatment may be completed by stopping heating after continued heating for a given time after a change in the sounds of collisions (for example, the point of time when the sounds of collisions become substantially minimum ones may be set as a tentative yardstick for termination of heating as shown in FIG. 4). However, the preferred heating time cannot be generically specified because it varies depending on the kind of thermoplastic polymer, the kind and particle size of photocatalyst, the ratio of the two used, etc., and is related with the time of continuation of the changed sounds of collisions and the thickness of fusion-bonded particles (B) as well as with the activity retention time of the resulting photocatalyst-bearing material and reaction conditions under which it is to be used. When heating is continued in a state of changed sounds of collisions for a long period of time, however, the resulting photocatalyst-bearing material is deformed far from the original shape of the carrier (A) and mutual fusion bonding of grains thereof occurs, thus resulting in failure in obtaining a desirable photocatalyst-bearing material.

The photocatalyst-bearing material of the present invention can be obtained, for example, by mixing and contacting the carrier (A) with particles (B) in a rotary heating drum to fusion-bond the particles (B) to surface portions of the carrier (A) in such a manner that multiple particles (B) are stacked in directions perpendicular to the surfaces of the carrier (A). Examples of such a rotary heating drum include a heating rocking mixer, a heating drum coater, a heating MARUMERIZER (registered trademark of products manufactured by Fuji Paudal Co., Ltd.), and an evaporator with a heating bath. Use of a rotary heating drum is preferred since mutual contact of grains of the carrier (A) via particles (B) can apply some pressure onto the surfaces thereof to press particles (B) being fusion-bonded to the surfaces of the carrier (A) against those surfaces, whereby the strength of fusion bonding can be enhanced.

Photocatalyst particles (B) may also be used in combination with an adsorbent, examples of which include activated carbon, activated alumina, silica gel, zeolite, and activated clay. In this case, the carrier (A) may be mixed and contacted with particles (B) and an adsorbent either simply or after the particles (B) are preliminarily dotted or loaded with the adsorbent, whereby the particles (B) and the adsorbent can be borne in and on surface portions of the carrier (A). The resulting photocatalyst-bearing material is of a hybrid type wherein the process of photocatalysis involving adsorption and photodecomposition is substantially functionally separated into two steps, i.e., a step of adsorption by the adsorbent and a step of photodecomposition by the photocatalyst particles. More specifically, this photocatalyst-bearing material is used while continuously reactivating the adsorbent with photocatalyst particles. Since titanium dioxide as the most representative photocatalyst is a solid acid, it exhibits a strong adsorption performance against basic substances such as ammonia, but not so strong an adsorption performance against acidic substances such as mercaptans. In the case of the acidic substances, therefore, titanium dioxide, combined and mixed with the above-mentioned adsorbent, proves its true merit.

Figure 1:
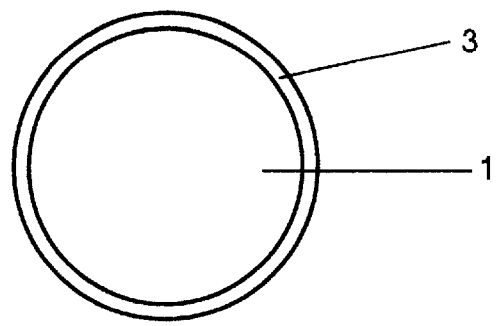
FIG. 1 is a model diagram illustrating a cross-sectional structure of an example of the photocatalyst-bearing material of the present invention.
Figure 2:
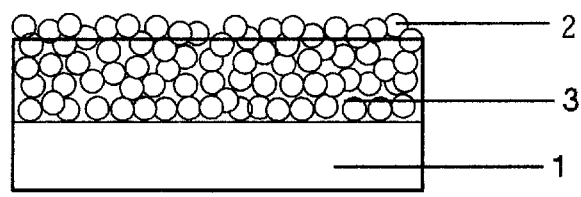
FIG. 2 is an enlarged cross-sectional model diagram of a surface portion of the photocatalyst-bearing material of FIG. 1.

FIG. 1 is a model diagram illustrating the cross-sectional structure of an example of the photocatalyst-bearing material of the present invention. A photocatalyst particles-loaded layer 3 exists in a surface portion of a substantially spherical carrier grain 1 of thermoplastic polymer. FIG. 2 is an enlarged cross-sectional model diagram of this surface portion. As shown in FIG. 2, photocatalyst particles 2 are borne in the photocatalyst particles-loaded layer 3 as a surface portion of the carrier grain 1 of thermoplastic polymer in such a state that multiple particles 2 are stacked in directions perpendicular to the surfaces of the carrier grain 1. Incidentally, in FIG. 2, photocatalyst particles 2 are drawn as being in such a state that about 5 particles 2 are stacked in directions perpendicular to the surfaces of the carrier grain 1. This is greatly varied depending on the amount of particles 2 borne on the carrier grain 1. Far more than 100 particles 2 may actually be stacked in directions perpendicular to the surfaces of the carrier grain 1. Depending on fusion bonding conditions, particles 2 can be stacked in substantially the closest packing state. FIG. 3 is a model diagram illustrating the cross-sectional structure of another example of the photocatalyst-bearing material of the present invention. A cavity 4 of a glass balloon or the like exists in a central portion of a substantially spherical carrier grain 1 of thermoplastic polymer to provide a hollow carrier having a photocatalyst particles-loaded layer 3 in a surface portion thereof.

The photocatalyst-bearing material of the present invention may be used either alone or in combination with an oxidizing agent. As described hereinbefore, photocatalyst particles (B) in the photocatalyst-bearing material of the present invention give birth to electrons in the conduction band and holes in the valence band upon irradiation thereof with a light having an energy of at least the band gap thereof. In order to allow oxidation reactions with such holes excited by photons to proceed speedily according to the oxidation mechanism thereof, there may favorably exist in the system an oxidizing agent as an electron acceptor capable of quickly depriving photocatalyst particles of electrons produced therein upon light irradiation thereof. Examples of such an oxidizing agent, which is not particularly limited insofar as it can accept electrons produced in photocatalyst particles upon light irradiation thereof, include oxygen gas; oxygen- and/or ozone-containing gases such as air and an ozone-air mixture; ozone-containing water; peroxides; hypohalogenous acids such as hypochlorous acid and hypobromous acid; and hypohalogenites such as sodium hypochlorite, potassium hypochlorite, calcium hypochlorite, and sodium hypobromite; perhalogenic acids such as perchloric acid, perbromic acid, and periodic acid; and perhalogenates such as sodium perchlorate, potassium perbromate, and potassium periodate. Herein, examples of peroxides include organic peroxides as organic hydrogen peroxide adducts, such as ketone peroxides, diacyl peroxides, alkyl hydroperoxides, dialkyl peroxides, peroxyketals, peroxyesters, peroxycarbonates, and urea-hydrogen peroxide adduct; and inorganic peroxides as inorganic hydrogen peroxide adducts, such as sodium tripolyphosphate-hydrogen peroxide adduct, sodium pyrophosphate-hydrogen peroxide adduct, sodium sulfate-hydrogen peroxide adduct, sodium carbonate-hydrogen peroxide adduct, sodium perborate, sodium peroxide, calcium peroxide, barium peroxide, and hydrogen peroxide. Preferably usable oxidizing agents include oxygen- and/or ozone-containing gases and hydrogen peroxide, among which oxygen-containing gases such as air are especially preferred.

When the photocatalyst-bearing material of the present invention is used, it must be irradiated with a light including at least a wavelength at which charge separation (separation of electrons and holes) of the photocatalyst is brought about. Such a wavelength differs from photocatalyst to photocatalyst. When use is made of titanium dioxide that is a representative example of photocatalyst particles (B), such wavelengths are 380 nm and shorter. Examples of the source of such a light, which is not particularly limited, include the sun, a low-pressure mercury lamp, a medium-pressure mercury lamp, a high-pressure mercury lamp, an ultraviolet sterilization lamp, a xenon lamp, a black light, and ordinary fluorescent lamps.

EXAMPLES

The following Examples will more specifically illustrate the present invention, but should not be construed as limiting the scope of the invention.

Example 1

Polymer grains having an average diameter of about 1 mm and made of an ethylene-vinyl acetate copolymer (melt flow rate: 18 g/10 min., vinyl acetate monomer unit content: 28%, melting temperature: 71° C., trade name: "URUTO-RASEN (transliterated) 710," manufactured by TOSOH CORPORATION) were prepared by the underwater cutting method. 80 wt. % of these polymer grains and 20 wt. % of titanium dioxide particles (trade name: "P25," manufactured by Degussa Co., Ltd.) as photocatalyst particles were charged into an eggplant type flask, which was then rotated and heated up to 145° C. in an oil bath to fusion-bond the photocatalyst particles to surface portions of the polymer grains. Almost all of the charged titanium dioxide particles were borne on the polymer grains. Thus, the photocatalyst particles content (borne titanium dioxide content) of the resulting photocatalyst-bearing material was about 20 wt. %.

20 g of the photocatalyst-bearing material and a water sample containing 5 ppm trichloroethylene (TCE) were charged into a closed top container made of quartz glass, and then subjected under stirring to one hour of irradiation with ultraviolet rays emitted from an ultraviolet sterilization lamp (dominant wavelength: 254 nm, output: 15 W) disposed outside the container. After irradiation, the TCE concentration of the water sample was determined by gas chromatography, and the state of release, or dislodgment, of titanium dioxide particles was visually confirmed. The results are shown in Table 1.

Comparative Example 1

The same polymer grains as in Example 1 were prepared. 80 wt. % of these polymer grains and 20 wt. % of the same titanium dioxide particles as in Example 1 were charged into a hybridization system (manufactured by Nara Machinery Co., Ltd.), which was then worked at 5,600 rpm for 5 minutes to give impacts to the grains and the particles being dispersed in a gaseous phase, whereby a photocatalyst-bearing material was obtained. However, a difficulty was encountered in bearing all the photocatalyst particles on the polymer grains, and the photocatalyst particles content of the photocatalyst-bearing material was 7 wt. %.

20 g of the photocatalyst-bearing material and a water sample containing 5 ppm trichloroethylene (TCE) were charged into a closed top container made of quartz glass, and then subjected under stirring to one hour of irradiation with ultraviolet rays emitted from an ultraviolet sterilization lamp (dominant wavelength: 254 nm, output: 15 W) disposed outside the container. After irradiation, the TCE concentration of the water sample was determined by gas chromatography, and the state of release, or dislodgment, of titanium dioxide particles was visually confirmed. The results are shown in Table 1.

TABLE 1

|  | Example 1 | Comparative Example 1 |
| --- | --- | --- |
| Borne Titanium Dioxide Content | 20 wt. % | 7 wt. % |
| TCE Concentration | <0.1 ppm | 1.5 ppm |
| State of Titanium Dioxide Being Borne | not changed | Water sample was slightly turbid |

It is apparent from the results in Table 1 that the photocatalyst-bearing material of the present invention can have more photocatalyst particles firmly borne therein to exhibit excellent photocatalysis.

Example 2

300 g of linear low-density polyethylene pellets (specific gravity: 0.92, trade name: NIPOLON L-M65, manufactured by TOSOH CORPORATION) as a carrier and 18.4 g of the same titanium dioxide particles as in Example 1 were charged into a 1-liter eggplant type flask, which was installed in a stirring unit of evaporator capable of rotational stirring to preliminarily stir and uniformly mix the pellets and the particles. Next, a high-directivity microphone was set near the stirring unit. The eggplant type flask containing the mixture being stirred by rotation was dipped in an oil bath containing as the heating medium a silicone oil heated at 185° C., which exceeded the melting temperature (122° C.) of "NIPOLON L-M65."

FIG. 4 shows the results of recording changing sounds (expressed in terms of the output voltage of the microphone) of collisions of the carrier grains being stirred together with the particles inside the stirring unit being heated with the lapse of time. Heating was stopped at a point of time as shown by the arrow in FIG. 4. The amount of the photocatalyst-bearing material thus obtained was 317.8 g. A photocatalyst-loaded surface portion of this photocatalyst-bearing material was similar in cross section to the surface portion shown in FIG. 2, and was 20 to 40 μm in thickness. The photocatalyst accounted for 50 to 60% of the volume of the surface portion when calculation was made from the specific gravity of the photocatalyst "P25." Thus, the surface layer was formed, which had photocatalyst particles in contact with one another as shown in FIG. 2. This photocatalyst-bearing material was so lower in specific gravity than water as to well float on water.

Example 3

Figure 5:
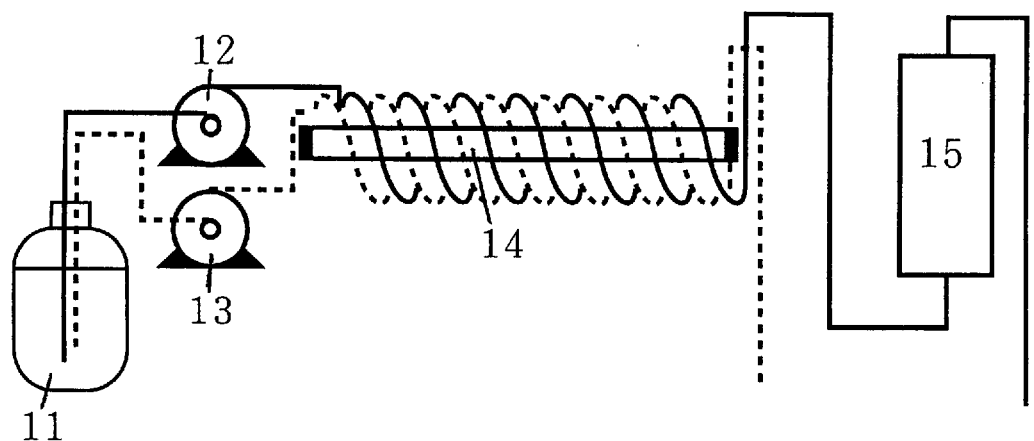
FIG. 5 is a schematic flow diagram of a photochemical catalysis measurement system (photochemical catalysis is evaluated by changes in conductivity) through which sample solutions having varied sucrose concentrations were each passed in Example 3.
Figure 6:
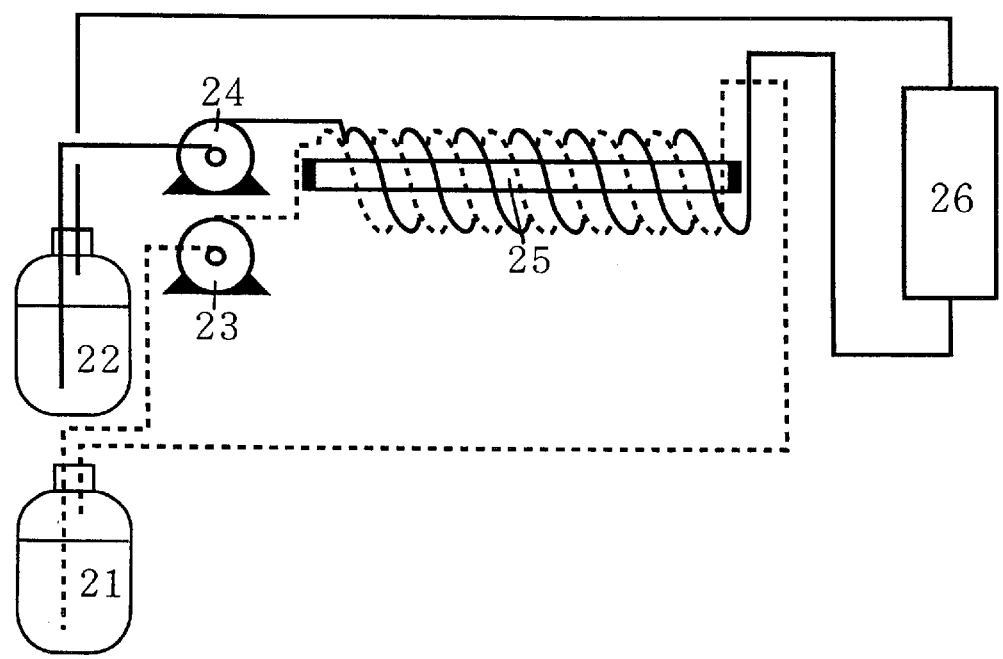
FIG. 6 is a schematic flow diagram of a photochemical catalysis measurement system (photochemical catalysis is evaluated by changes in conductivity) through which a sample solution was circulated in Example 3.

The photochemical catalysis of the photocatalyst-bearing material of the present invention was confirmed using measurement systems of FIGS. 5 and 6. The system of FIG. 5 is a photochemical catalysis measurement system (photochemical catalysis is evaluated in terms of changes in conductivity) used in the case where sample solutions varied in sucrose concentration were each passed therethrough. The photocatalyst-bearing material (average diameter: 1.5 to 1.6 mm) prepared in Example 2 and a carrier not yet loaded with the photocatalyst (carrier without any borne photocatalyst) were filled into respective polytrifluoroethylene tubes having the same length and an inside diameter of 2.8 mm, which were wound around a black light 14 as shown in FIG. 5 to use them as reaction columns. In FIG. 5, the solid line represents a line having a column filled with the photocatalyst-bearing material, while the broken line represents a line having a column filled with the carrier without any borne photocatalyst. As shown in FIG. 5, two constant flow rate pumps 12 and 13 connected to a sample solution tank 11 were connected with the respective columns, which were connected on the sample solution outflowing side thereof with a conductivity detector 15 when a test was to be carried out. Incidentally, only the line having the column filled with the photocatalyst-bearing material is drawn as being connected with the conductivity detector 15 in FIG. 5. When the column filled with the carrier without any borne photocatalyst was to be used, however, the line having the column filled with the photocatalyst-bearing material was disconnected from the conductivity detector 15, and the line having the column filled with the carrier without any borne photocatalyst was instead connected with the conductivity detector 15.

On the other hand, the system of FIG. 6 is a photochemical catalysis measurement system (photochemical catalysis is evaluated in terms of changes in conductivity) used in the case where a sample solution was circulated. The photocatalyst-bearing material (average diameter: 1.5 to 1.6 mm) prepared in Example 2 and the same carrier without any borne photocatalyst as described above were filled into respective polytrifluoroethylene tubes having the same length and an inside diameter of 2.8 mm, which were wound around a black light 25 as shown in FIG. 6 to use them as reaction columns. In FIG. 6, the solid line represents a line having a column filled with the photocatalyst-bearing material, while the broken line represents a line having a column filled with the carrier without any borne photocatalyst. As shown in FIG. 6, two constant flow rate pumps 23 and 24 connected to respective sample solution tanks 21 and 22 were connected with the respective columns, which were connected on the sample solution outflowing side thereof with a conductivity detector 26 when a test was to be carried out. Incidentally, only the line having the column filled with the photocatalyst-bearing material is drawn as being connected with the conductivity detector 26 in FIG. 6. When the column filled with the at carrier without any borne photocatalyst was to be used, however, the line having the column filled with the photocatalyst-bearing material was disconnected from the conductivity detector 26, and the line having the column filled with the carrier without any borne photocatalyst was instead connected with the conductivity detector 26.

Figure 7:
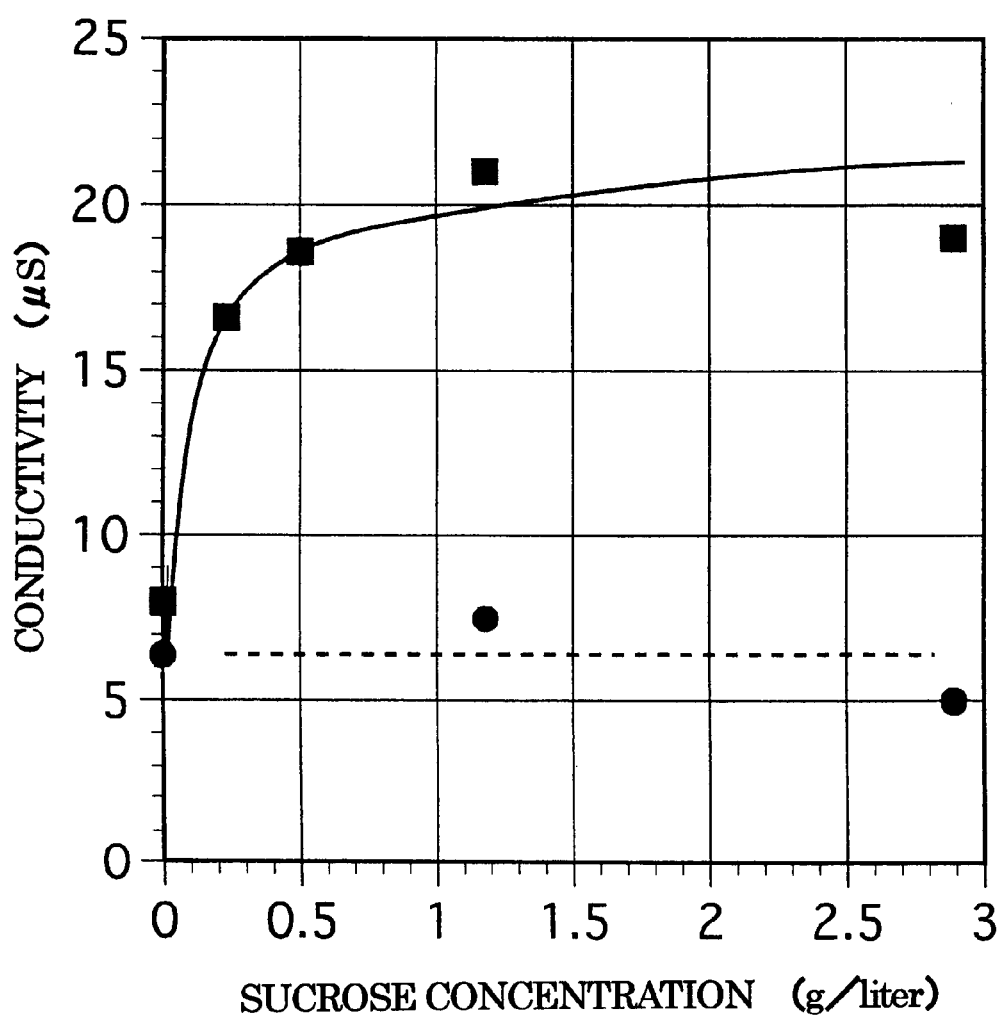
FIG. 7 is a graph showing results of measurement of conductivity, obtained by varying the sucrose concentration of sample solution while using the measurement system of FIG. 5 in Example 3.

Solutions of sucrose dissolved in pure water were prepared as sample solutions for use in measurement of photochemical catalysis. Sucrose is not electroconductive unless it is decomposed by an oxidation reaction. When sucrose undergoes oxidation decomposition to yield carbonate ions, however, the conductivity increases. FIG. 7 shows the results of measurement of conductivity, obtained by varying the sucrose concentration of sample solution while using the measurement system of FIG. 5. In FIG. 7, symbols ■ represent a plot drawn when measurement was done with the conductivity detector 15 connected with the line having the column filled with the photocatalyst-bearing material, while symbols ● represent a plot drawn when measurement was done with the conductivity detector 15 connected with the line having the column filled with the carrier without any borne photocatalyst. When use was made of the column filled with the photocatalyst-bearing material, the conductivity gradually increased as the sucrose concentration was heightened, but the conductivity became substantially constant above a given sucrose concentration. By contrast, the column filled with the carrier without any borne photocatalyst was used as a reference column, no changes in conductivity occurred.

Figure 8:
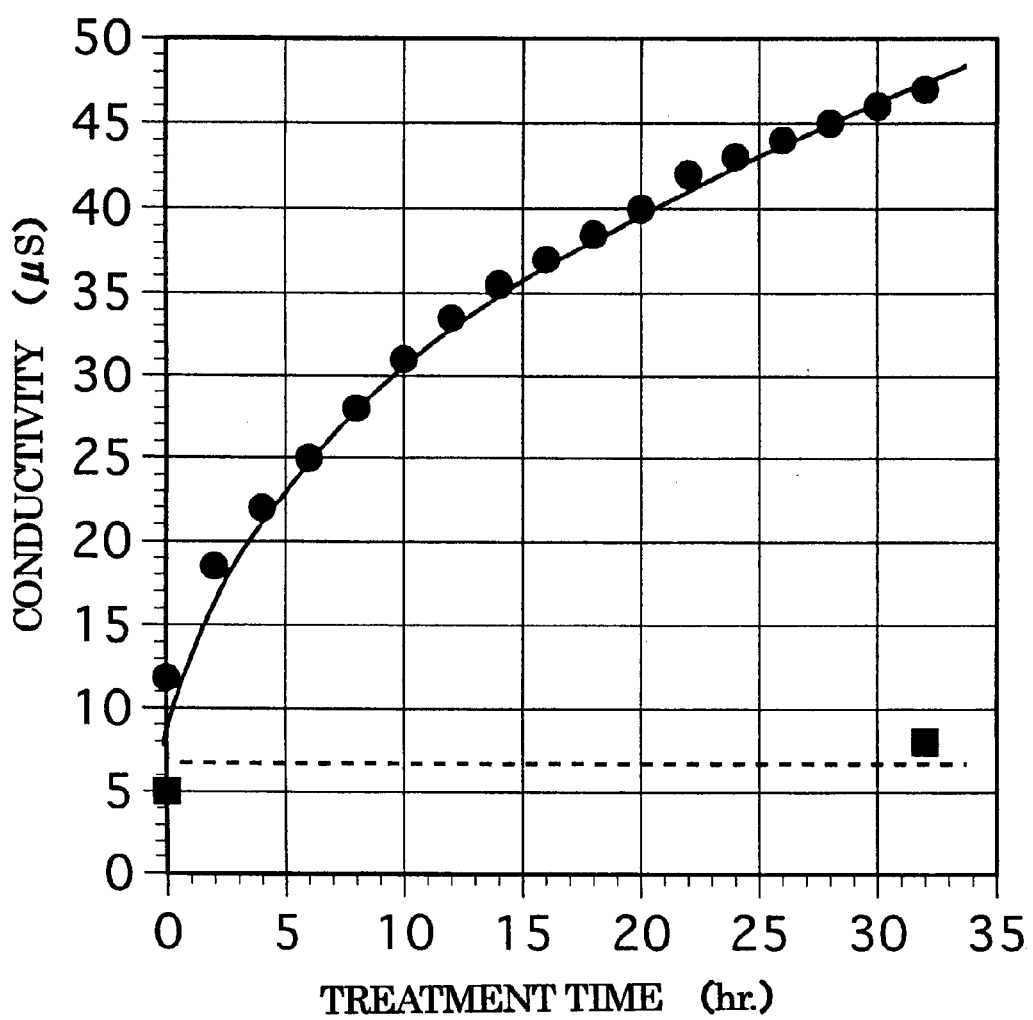
FIG. 8 is a graph showing results of measurement of conductivity, which changed with the lapse of time when a sample solution having a given sucrose concentration was circulated through the measurement system of FIG. 6 in Example 3.

FIG. 8 shows the results of measurement of conductivity, which changed with the lapse of time when a sample solution (sucrose concentration: 2.89 g/liter) was circulated through the measurement system of FIG. 6. In FIG. 8, symbols ● represent a plot drawn when measurement was done with the conductivity detector 26 connected with the line having the column filled with the photocatalyst-bearing material while symbols ■ represent a plot drawn when measurement was done with the conductivity detector 26 connected with the line having the column filled with the carrier without any borne photocatalyst. As shown in FIG. 8, the sucrose-containing sample solution yielded carbonate ions to increase the conductivity with the lapse of time when the sample solution was circulated while passing it through the column filled with the photocatalyst-bearing material. By contrast, the column filled with the carrier without any borne photocatalyst was used as a reference column, no changes in conductivity occurred.

INDUSTRIAL APPLICABILITY

According to the present invention, there can be provided a photocatalyst-bearing material having surface portions thereof where multiple photocatalyst particles are stacked and firmly borne. Since multiple photocatalyst particles are stacked in and on surface portions of the photocatalyst-bearing material, photocatalyst particles, even if partly released, or dislodged, because of deterioration of the surfaces of the photocatalyst-bearing material, sequentially appear from under to be exposed from the surfaces of the material. Accordingly, this photocatalyst-bearing material can maintain photocatalysis for a long period of time. On the other hand, the method of producing a photocatalyst-bearing material according to the present invention is so simply operable as to be well fit for mass production thereof.

Meanwhile, conventional photocatalysts having a greater specific gravity are low in activity in water because they sink to the bottom of water to be barely capable of receiving a slight quantity of light. By contrast, since the specific gravity of the photocatalyst-bearing material of the present invention can be simply adjusted as needed, it can be so set as to make the photocatalyst-bearing material float on water surfaces of lakes, ponds, pits, etc. In this case, the photocatalyst-bearing material can efficiently receive a light with a wavelength(s) capable of activating the photocatalyst with the light, such as the sunlight. Accordingly, the photocatalyst-bearing material of the present invention can be used for decomposing organics in water and removing BOD components from water. Since the photocatalyst-bearing material of the present invention can be simply adjusted in specific gravity, it can also be used in large-throughput continuous BOD component removal systems using a light and a fluidized bed. The photocatalyst-bearing material of the present invention can further be used for continuous removal of BOD components in a fixed bed filled therewith as demonstrated in Examples. Furthermore, since the specific gravity and grain size of the photocatalyst-bearing material of the present invention can be simply adjusted, the photocatalyst-bearing material, when prepared to have such specific gravity and grain size as to be fit for use in a fluidized bed, a fixed bed or the like, can also be applied to organics-in-gas decomposition systems provided with a fluidized bed, a fixed bed or the like. The photocatalyst-bearing material of the present invention can also be used for decomposition of dyes and the like, treatment of wastewater discharged from the livestock industry, etc.

What is claimed:

1. A photocatalyst-bearing material comprising a carrier (A) of thermoplastic polymer, and particles (B) capable of photocatalysis, which particles are fusion-bonded to surface portions of said carrier (A) in such a state that multiple particles (B) are stacked in directions perpendicular to the surfaces of said carrier (A).

2. A photocatalyst-bearing material as claimed in claim 1, which has a specific gravity of 0.7 to 1.3.

3. A photocatalyst-bearing material as claimed in claim 1, wherein said thermoplastic polymer is at least one polymer selected from the group consisting of olefin homopolymers, copolymers of olefins, and copolymers of at least one olefin with at least one other polymerizable monomer, said at least one other polymerizable monomer being selected from the group consisting of alicyclic monoenes, dienes, vinyl esters, unsaturated carboxylic acids and alkyl esters, alkali metal salts, alkaline earth metal salts, ammonium salts and acid anhydrides thereof, unsubstituted or substituted (meth) acrylamides, acrylonitrile, methacrylonitrile, sulfonic group-containing monomers, phosphonic group-containing monomers, N-vinylpyrrolidone, N-vinylformamide, acrolein, vinyl chloride, vinylidene chloride, chloroprene, ethylene fluoride, and styrene.

4. A photocatalyst-bearing material as claimed in claim 1, wherein said thermoplastic polymer has a melting temperature of 50 to 150° C.

5. A method of producing a photocatalyst-bearing material, comprising mixing and contacting a carrier (A) of thermoplastic polymer with particles (B) capable of photocatalysis in such a way as to fusion-bond the particles (B) to surface portions of said carrier (A) in such a manner that multiple particles (B) are stacked in directions perpendicular to the surfaces of said carrier (A).

6. A method of producing a photocatalyst-bearing material as claimed in claim 5, wherein fusion bonding treatment is effected by mixing and stirring said carrier (A) and said particles (B) at a temperature higher than the melting temperature of said thermoplastic polymer while causing collisions of said carrier (A) being stirred together with said particles (A), and is completed by stopping heating after continued heating for a given time after a change in the sounds of collisions caused by mixing and stirring said carrier (A) and said particles (B).

* * * * *

UNITED STATES PATENT AND TRADEMARK OFFICE
CERTIFICATE OF CORRECTION

PATENT NO.    : 6,524,997 B1  
DATED         : February 25, 2003  
INVENTOR(S)   : Yuji Higo and Daisaku Yano It is certified that error appears in the above-identified patent and that said Letters Patent is hereby corrected as shown below:

<u>Title page,</u>  
Item [56], References Cited, OTHER PUBLICATIONS, insert:  
-- Derwent Abstract of Japanese Patent Kokai No. 10-168325  
Derwent Abstract of Japanese Patent Kokai No. 11-169725 --

Signed and Sealed this

Sixteenth Day of September, 2003

JAMES E. ROGAN  
*Director of the United States Patent and Trademark Office*